Sept. 19, 1933.          G. M. EATON ET AL          1,927,656
                              PIPE JOINT
                   Filed Dec. 23, 1931          2 Sheets-Sheet 1
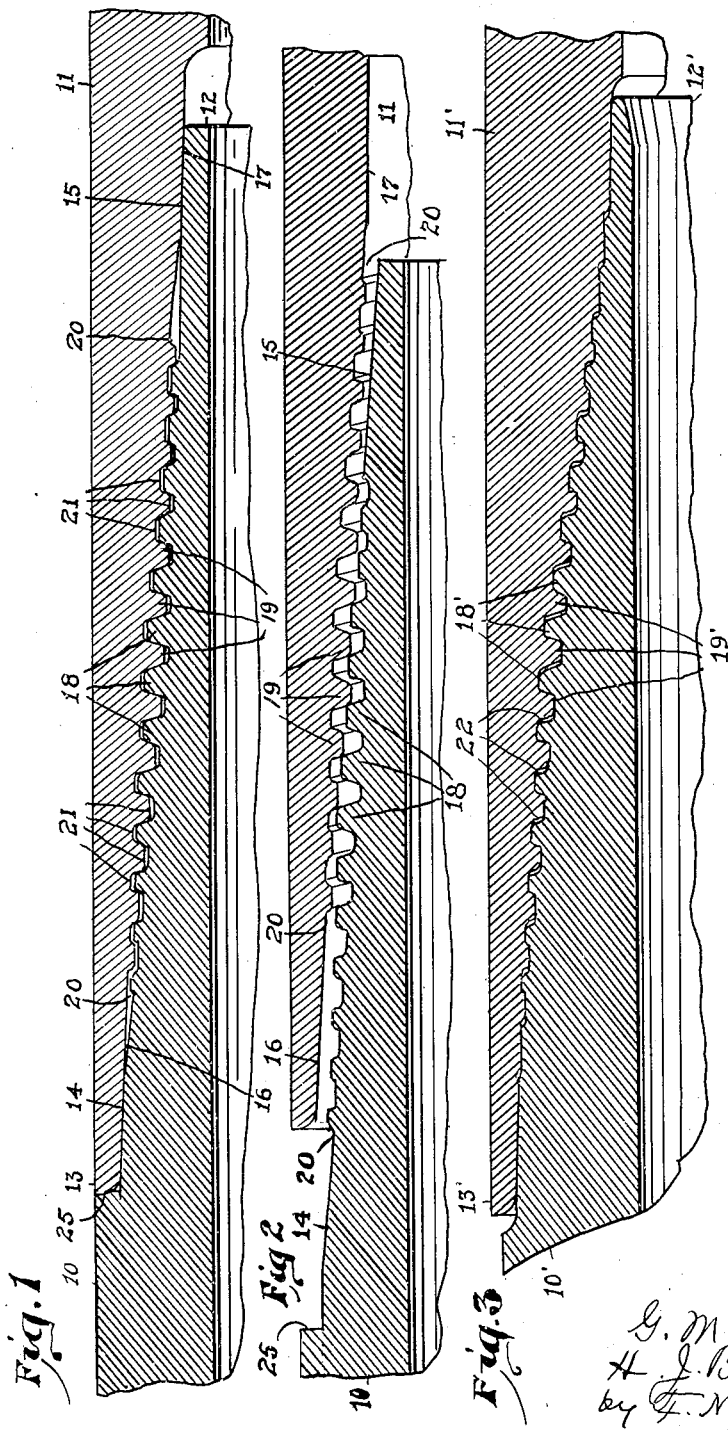

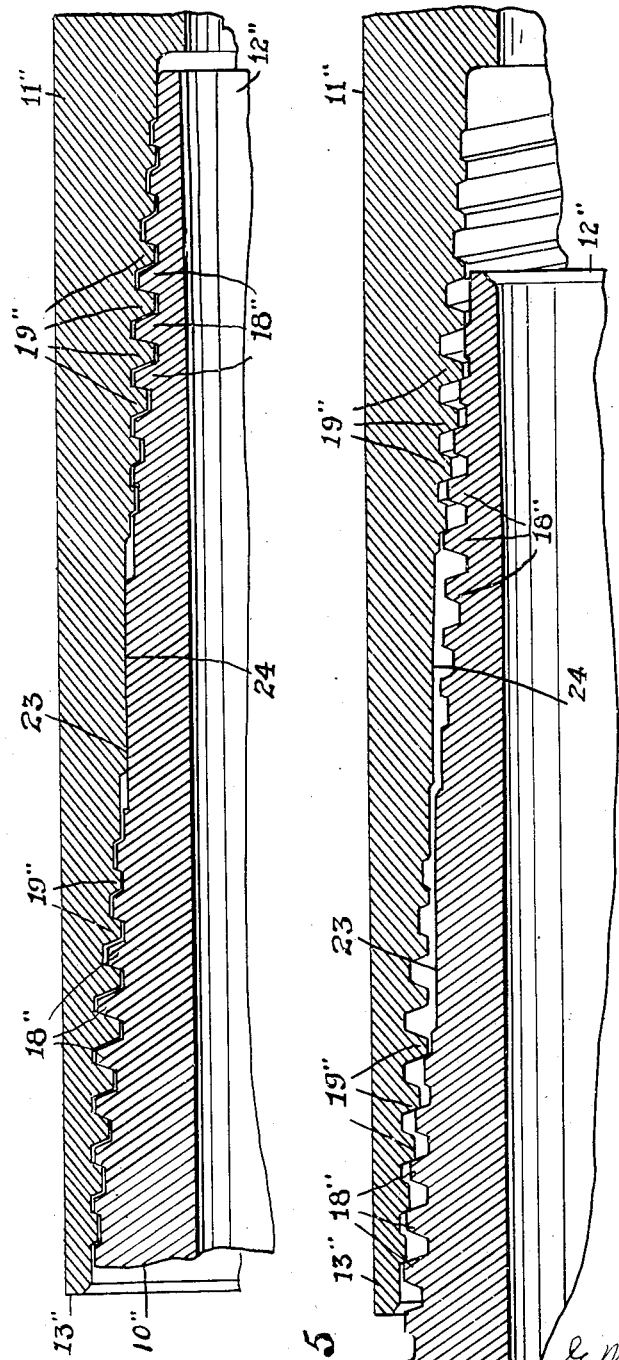

Patented Sept. 19, 1933

1,927,656

UNITED STATES PATENT OFFICE 1,927,656

PIPE JOINT

George M. Eaton, Ben Avon, and Howard J. Burnish, Sewickley, Pa., assignors to Spang, Chalfant & Co., Inc., Pittsburgh, Pa., a corporation of Pennsylvania Application December 23, 1931
Serial No. 582,822

5 Claims. (Cl. 285—146)

Our invention relates to an improved type of threaded joint or tube and is particularly directed to the construction of the threaded connection between consecutive lengths of pipe or tubing for oil wells.

The construction which we have developed is designed to overcome such characteristic difficulties as are incurred in the use of pipe or casing in oil wells, namely, the parting of a string of pipe or casing at a joint due to insufficient strength, leakage of pressure fluid through the joint resulting in the cutting or washing away of the pipe wall, and the galling of threads due to damage caused to the threads when stabbing, which is the initial operation in the making up of a threaded connection when running a string of pipe in a well.

It is one object of this invention to provide means for joining together the consecutive lengths of pipe in a substantial manner so as to obtain maximum strength at the joint without increasing the wall thickness or with a minimum increase thereof of that portion of the pipe in which the screw threads are cut.

Another object of our invention is the provision of a thread form that permits stabbing without damage to the thread contour or the lateral faces of the thread form, thereby minimizing the destructive galling of the threads.

Another object is to provide a thread with lateral contact surfaces, the depth of which are gradually reduced from a maximum at a zone of greatest depth intermediate of its length to a vanishing point at each end of the thread, thereby increasing the strength of the threaded connection.

Another object is to provide means for effecting a substantial seal at the joint to prevent leakage of pressure fluid therethrough.

Another object is to provide an intermediate annular sealing surface between the adjacent or tandem threads to insure maximum metal backing at the seal to resist radial stresses and also serve as a fulcrum or central bearing point around which the overlapping intermeshing threaded ends of adjacent pipe elements may rock when the joint is subjected to flexure or bending stresses. The functioning of this feature will insure the maintaining of an effective hydraulic seal.

Another object is the provision of a seal between the overlapped threaded ends of pipe elements in such a position that the stresses due to the wedging effect at the seal are at a minimum thereby reducing the tendency of corrosion, which condition is accentuated in metal under stress.

Referring to the accompanying drawings, Fig. 1 is a longitudinal section of one form of our invention, the view having been taken on a plane which includes the axial centers of the two pipes connected by our improved threads, the pipes so connected being broken away shortly beyond the ends of the joint and also being broken away longitudinally a short distance radially from the interior walls of the pipes and the joint being shown as it appears when the threads of the pipes are completely engaged.

Fig. 2 shows a section like that in Fig. 1 except that the complementary threaded portions on the two pipes are shown in their relative positions at the close of a stabbing operation preparatory to screwing together these threaded portions.

Fig. 3 is a section like that in Fig. 1 except that in Fig. 2 the threads have lateral clearances with straight seals at their ends while in Fig. 1 the threads have clearances at their crests and roots with tapered seals at their lateral faces.

Fig. 4 shows a section of the same character as Fig. 1, each pipe having a plurality of threaded portions separated by tapered sealing surfaces, whereas in Fig. 1 the sealing is effected by tapered surfaces at the ends of the threaded portions.

Fig. 5 is a section of the same character as Fig. 2 showing the pipes of Fig. 4 in their stabbing relation.

Referring first to Figs. 1 and 2, 10 and 11 represent two pipes with the end 12 of the former within the end 13 of the latter. The exterior wall of the pipe-end 12 is provided in Fig. 1 with a thread 18 mating with a thread 19 on the interior wall of the pipe-end 13. Preferably, only the intermediate portions of the pipe-ends 12 and 13 are threaded, the external unthreaded portions 14 and 15 which extend along the pipe-end 12 longitudinally of the pipes in opposite directions forming annular preferably tapered sealing surfaces with the internal unthreaded portions 16 and 17 respectively which are on the pipe-end 13 beyond the opposite ends of the threaded portion thereon.

The depth of the turns of the threads 18 and 19 are gradually reduced in both directions from a maximum at the zone of greatest depth midway of the length of the threaded portions to the vanishing points 20 at the ends of the threaded portions.

The successive crests of the turns of the thread 18 on the pipe-end 12 extend outwardly radially from the axis of the pipe 10 a slightly greater distance as the crests are viewed successively from the thinner portions of the pipe-end 12 toward the thicker portions thereof. The successive crests of the turns of the thread 19 on the pipe-end 13 extend inwardly radially toward the axis of the pipe 11 a slightly greater distance as the crests are viewed successively from the thinner portions of the pipe-end 13 toward the thicker portions thereof. The distances of the successive crests from the axes of the pipes 10 and 11 are such that the crests on the two threads will not interengage until the pipe-ends have been telescoped during the stabbing operation. At the close of the stabbing operation the advancing corners of some of the turns on one pipe-end will abut against the corresponding corners of the turns of the other pipe-end, as shown along the intermediate portions of Fig. 2. In this view the turns of the threads on each pipe-end are positioned ready to move spirally between the turns of the other pipe-end, whereby the turns on each pipe-end sink deeper and deeper into the spiral spaces between the turns of the other pipe-end until finally the pipes 10 and 11 have been drawn together so that the sides of the turns on each pipe-end are engaged tightly with the sides of the turns on the other pipe-end. In Fig. 1 there are clearances 21 between the crests of the turns of each pipe-end and the root on the other pipe-end. In Fig. 2 the unthreaded portions 14 and 15 on the pipe-end 12 form a seal with the unthreaded portions 16 and 17 on the pipe-end 13 when the joint is screwed up tightly. Preferably these unthreaded portions are slightly tapered so as to increase the tightness of the seals as the pipes are screwed together.

Looking at the pipe-end 11 and particularly at Fig. 2 where the pipe-ends 11 and 12 are shown mostly separated, it is seen that the roots of the thread become successively shallower from an intermediate portion to the outer end of the pipe-end 11; that the crests of the thread from the said portion to the inner end of the threaded portion become successively shorter; that the crests of the threads which define the successively shallower roots conform to the taper of the interior surface of the pipe-end; that the roots of the threads defining the said successively shorter crests conform also to the said taper; that all the thread turns are truncated; that the truncated surfaces from the outer end of the pipe-end to the said intermediate portion conform to the taper of the interior surface of the pipe-end; and that the truncated surfaces on the remainder of the thread are parallel with the pipe-end, all as stated in the last paragraph above or as readily deduced therefrom. The structure just defined provides a smaller angle of taper than is possible if the roots of the threads decrease from the inner end of the threaded portion toward the outer end thereof, and if the crests of the threads increase in depth from the outer end. Applicants' construction gives a maximum wall thickness. By making the roots deepest at the small end of the interiorly threaded pipe-end, a considerable saving in reduction of wall-thickness is effected.

The pipe 10 carries a shoulder 25 for engagement with the end wall of the pipe-end 13 when the joint is fully screwed up tightly.

Fig. 3 is substantially like Fig. 1 except that in Fig. 3 the angles which the opposite sides of the turns make with the axis of the pipe are not equal as they are in Fig. 1. The angles which the left hand sides of the turns of the thread 18' and the right hand sides of the thread 19' make with the said axis, are steeper than the angles which the opposing sides of these turns make with the axis. This arrangement provides clearances 22 between the opposing sides of the turns with the less steep angles. In Fig. 3, the pipes are marked 10' and 11' while the pipe-ends are marked 12' and 13' respectively.

Referring now to Figs. 4 and 5, the pipes 10" and 11" have their respective ends 12" and 13" provided with duplex threads separated by annular sealing surfaces 23 and 24 on the respective pipe-ends. The two threads on the pipe-end 12" are 18" and on the pipe-end 13" are 19". Each thread is constructed according to the principles applied to the threads in Figs. 1, 2, and 3. Fig. 5 shows the pipe-end in stabbing relation ready to be screwed together in the usual manner. When the joint has been fully tightened the annular sealing surfaces 23 and 24 will be drawn tightly together as shown in Fig. 4. Preferably these surfaces are slightly tapered to increase the tightness of the sealing, but the fit between these surfaces, as also between the corresponding sealing surfaces on Figs. 1, 2, and 3, may be made so tight that in some instances the tapers may not be required.

We claim:—

1. In a pipe joint, a pipe-end having its interior surface tapered inwardly and threaded, the roots of the thread from an intermediate portion of the threaded length to the extremity of the pipe-end becoming successively shallower, and the crests of each succeeding turn of the thread from an intermediate portion of the threaded length to the extreme inner end of the thread being cut down toward the root, thereby decreasing successively the thread depth.

2. In a pipe joint, a pipe-end having its interior surface tapered inwardly and threaded, the roots of the thread from an intermediate portion of the threaded length to the extremity of the pipe-end becoming successively shallower, and the crests of the thread from an intermediate portion of the threaded length to the extreme inner end of the thread becoming successively shorter, the crests of the threads defining the said successively shallower roots conforming to the taper of the said interior surface.

3. In a pipe joint, a pipe-end having its interior surface tapered inwardly and threaded, the roots of the thread from an intermediate portion of the threaded length to the extremity of the pipe-end becoming successively shallower, and the crests of the thread from an intermediate portion of the threaded length to the extreme inner end of the thread becoming successively shorter, the crests of the threads defining the said successively shallower roots conforming to the taper of the said interior surface and the roots of the thread defining the said successively shorter crests conforming also to the said taper.

4. In a pipe joint, a pipe-end having its interior surface tapered inwardly and threaded, the roots of the thread from an intermediate portion of the threaded length to the extremity of the pipe-end becoming successively shallower, and the crests of the thread from an intermediate portion of the threaded length to the extreme inner end of the thread becoming successively shorter, all the turns of the thread being truncated, the truncated surfaces from the outer end of the pipe-end to the said intermediate portion conforming to the taper of the said interior surface while the truncated surfaces of the remaining portion of the thread are parallel with the pipe-end.

5. In a pipe joint, a pipe-end having its interior surface tapered inwardly and threaded, the roots of the thread from an intermediate portion of the threaded length to the extremity of the pipe-end becoming successively shallower, and the crests of each succeeding turn of the thread from an intermediate portion of the threaded length to the extreme inner end of the thread being cut down toward the root, thereby decreasing successively the thread depth, in combination with a pipe-end provided with an exterior thread having complementary engagement with the thread in the first pipe-end.

GEORGE M. EATON.
HOWARD J. BURNISH.